United States Patent
Bhatt et al.

(10) Patent No.: US 6,447,298 B1
(45) Date of Patent: Sep. 10, 2002

(54) SKETCHING DEVICE FOR USE BY A BLIND PERSON

(76) Inventors: Dilip Balmukund Bhatt, 204, Aawas Apts., Bhaikaka Nagar Thaltej Road, Ahmedabad 380059 (IN); Pragnya Dilip Bhatt, 204, Aawas Apts., Bhaikaka Nagar Thaltej Road, Ahmedabad 380059 (IN)

( * ) Notice: Subject to any disclaimer, the term of this patent is extended or adjusted under 35 U.S.C. 154(b) by 0 days.

(21) Appl. No.: 09/801,054

(22) Filed: Mar. 8, 2001

(51) Int. Cl.7 .............................................. G09B 11/00
(52) U.S. Cl. ........................... 434/85; 434/87; 434/112
(58) Field of Search .............................. 434/85, 87, 88, 434/90, 112, 117; 132/325

(56) References Cited

U.S. PATENT DOCUMENTS

| | | | | |
|---|---|---|---|---|
| 3,373,509 A | * | 3/1968 | Brass | 401/48 |
| 3,541,706 A | * | 11/1970 | Shapiro | 178/18.01 |
| 3,872,611 A | * | 3/1975 | Kuhn | 434/117 |
| 4,611,994 A | * | 9/1986 | Glover | 434/85 |
| 4,865,547 A | * | 9/1989 | Glover | 434/85 |
| 5,217,378 A | * | 6/1993 | Donovan | 434/112 |
| 5,251,651 A | * | 10/1993 | Mason | 132/324 |
| 5,899,214 A | * | 5/1999 | Francis | 132/323 |

* cited by examiner

*Primary Examiner*—Kien T. Nguyen
(74) *Attorney, Agent, or Firm*—Venable; George H. Spencer; Ashley J. Wells

(57) ABSTRACT

A sketching device for use by a blind person includes a pen body which is hollow and which has a writing end; a bobbin spool encloser which is secured to the pen body, which has slots provided in opposite sides thereof, and which has a hole defined therein through which thread may pass into the pen body; an axle positioned within the bobbin spool encloser and extending through the slots; a bobbin spool positioned on the axle; thread wound onto the bobbin spool threaded through the hole provided in the bobbin spool encloser and passing into and through the hollow pen body, and exiting the writing end of the pen body; knobs provided at both the ends of the axle to retain the axle and bobbin spool within the bobbin spool encloser; and thread cutting means provided at the writing end of the pen body for cutting the thread.

20 Claims, 2 Drawing Sheets

SKETCHING DEVICE FOR USE BY A BLIND PERSON

BACKGROUND OF THE INVENTION

1. Field of the Invention

This invention relates to a Sketching device for tactile graphics through thread delivery over Hook & Loop fabric surface for use by a blind person. The device is useful to be used as a educational aid by the teachers/blind person.

2. Description of the Related Art

The blind children/persons communicates with the world by sensing touch, feel, sound, signals, and smell. There are some tactile graphics aids available in the prior art. One of such aid comprises a plain surface having stencils art out of card board or wood pasted thereon, and which is being touched and sensed by a blind person. Another tactile graphic aid comprises thread stiching on paper by swing needle. Yet another tactile graphics aid comprises a paper having perforated dots therein of the shape which is to be sensed by a blind person. Still another device comprises a spur wheel to make dotted line on paper. Another tactile graphics aid comprises a metal sheet having embossed lines thereon of the desired shape.

There are certain disadvantages associated with the above mentioned educational aids. One of the main disadvantage is that it takes a lot of time to prepare these aid to be used by the teacher as well as by the blind students.

Another disadvantage is that the blind students cannot practice without the help of a teacher that is self performance/learning is difficult.

Yet another disadvantage is that of the wastage of materials during the fabrication of such devices.

Still another disadvantage is that different sketches, figures can not be prepared by the user over the same media.

OBJECTS OF THE INVENTION

Therefore the main object of this invention is to provide a Sketching device which can be used by a blind person for self performance for making Sketches over a Hook & Loop fabric surface or glued adhesive surface by thread delivery thereon and realisation of the same and thus increases the creativity of the child/student.

Another object of this invention is to provide a sketching device by which the sketch can be drawn on a slate having a hook and loop fabric surface by a blind person, as well as a mentally retarded person or a hearing impaired person, on his/her own and thus stimulate locomotive movement of the wrist/muscles.

Still another object of this invention is to propose a sketching device to make sketches on a Hooks fabric surface and which are easily removed and thus renders the device to be used repeatedly.

Yet another object of this invention is to provide a sketching device to make sketches on a Hook & Loop surface in which the length can be measured by providing knotes in the threads at predetermined interval.

Another object of this invention is to provide a sketching device that can be used with geometrical instruments like a compass, a scale, etc.

SUMMARY OF THE INVENTION

According to this invention there is provided a Sketching device for use by a blind person comprising a pen body secured to a metallic encloser, slaughts being provided in the opposite sides of said encloser for holding a bobbin spool secured on an axle for winding acrylic or wool thread thereon, a knob being provided at both the ends of said axle for winding said thread in the bobbin spool, means being provided at the writing end of the pen body for cutting the thread, a pilot thread being provided with the bobbin spool for the replacement of said thread when required.

In accordance with this invention the device used by the blind person to prepare Sketches, drawing, graphics over a Hook & Loop surface has a ball pen type body for facilitating the passes of the acrylic thread or wool thread therethrough. The upper end of the pen body is secured to an encloser by means of a nut. The encloser is provided to hold a bobbin spool therein and in the slaughts provided in the opposite sides of the encloser. The bobbin spool is secured on an axle adapted to be fitted movably in the slaughts provided in the sides of the encloser. A knob is provided at both ends of the axle for winding the acrylic thread in the bobbin spool manually. Means comprising a notched sleeve is provided at the pen body near the writing end of said body for facilitating the cutting of the thread.

BRIEF DESCRIPTION OF THE DRAWINGS

A Sketching device according to a preferred embodiment is herein described and illustrated in the accompanying drawings wherein.

DESCRIPTION OF THE PREFERRED EMBODIMENTS

Figure 1:
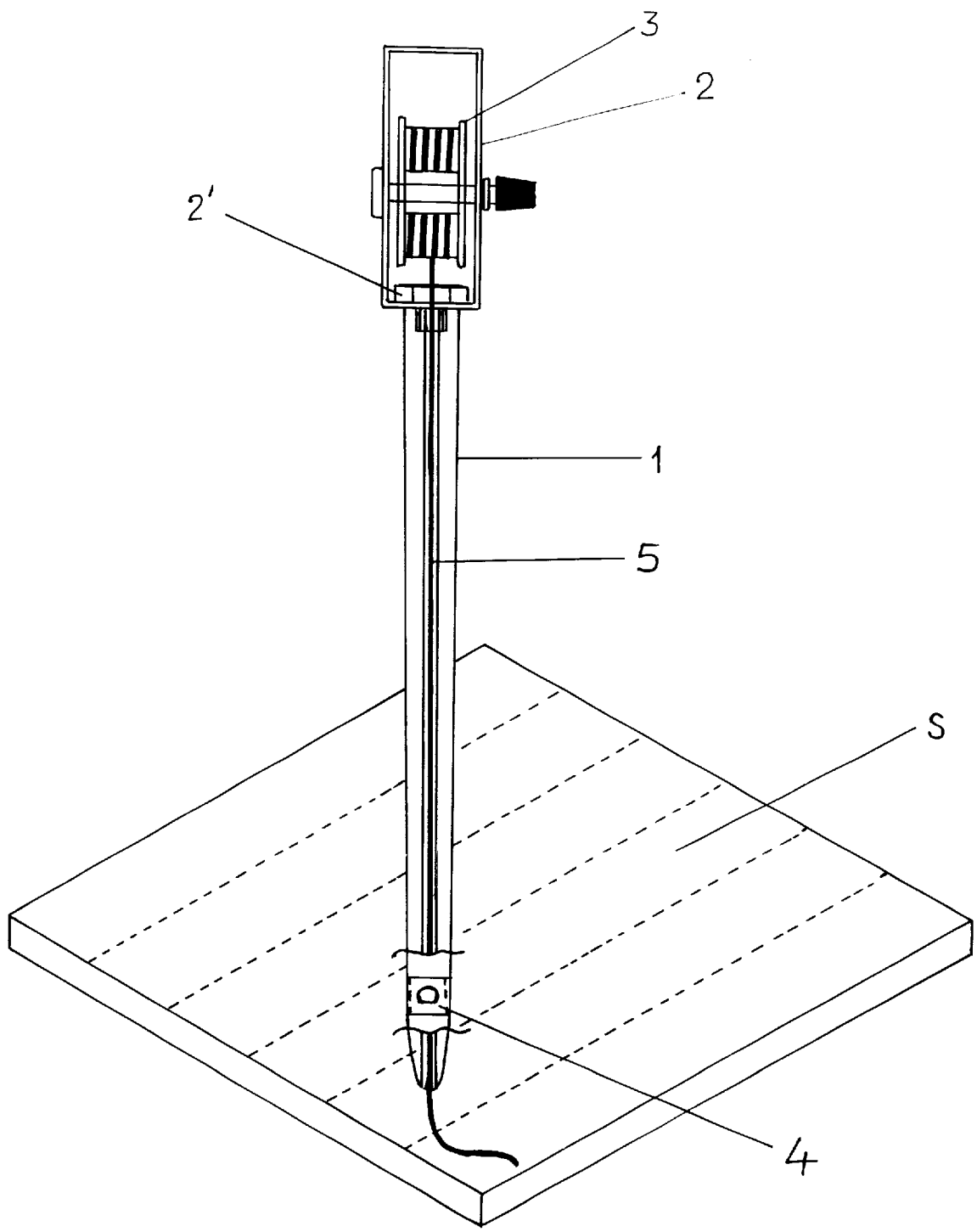
FIG. 1 shows the perspective view of the sketing device to be used on Hook & Loop fabric, fastener unit.

Referring to the drawings particular FIG. 1 the sketching device proposed by this invention to be used by a blind person for tactile graphics through thread delivery over hook and loop surface S has a hollow pen type body 1 having a metallic for example aluminum encloser 2 secured at the top end of the pen body 1 with the help of a conventional fastening means 2'. A bobbin spool 3 is provided with a metallic encloser 2 rotatably and removably for holding acrylic or wool thread 5 wound therein. Cutting means, for example, a notched sleeve 4, is provided near the lower end of the pen body 1 for facilitating the cutting of the thread after completion of work by the user. A pilot thread (not shown) is provided with the bobbin spool 3 for the replacement of the thread 5 as and when required.

Figure 2:
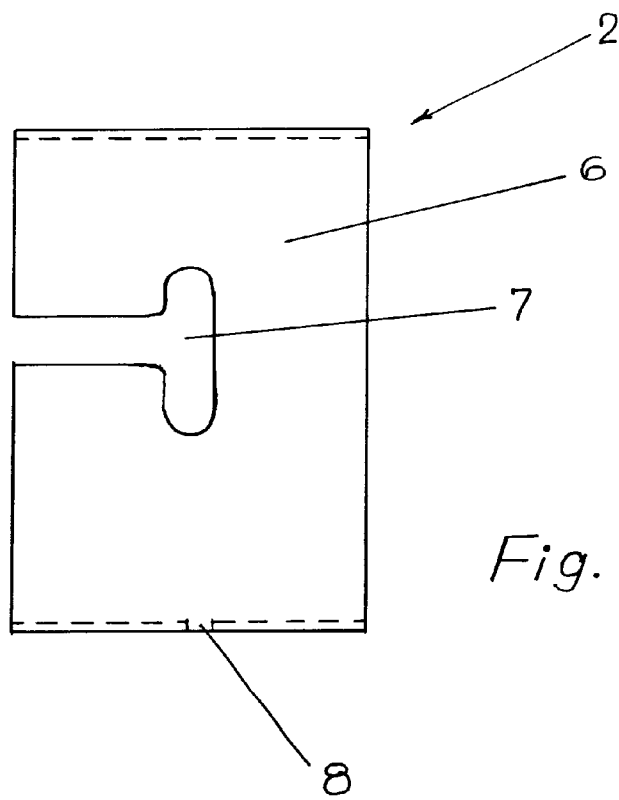
FIG. 2 shows the e front and side view of the encloser

The encloser 2 as shown in FIG. 2 has tubular body 6 in the form of any shape like a rectangle, square or circular. In the figure a rectangular tubular shape has been shown but the invention is not restricted to such a shape. A T-slot 7 is provided on opposite sides of the encloser body 6 to hold the bobbin spool 3 therein during the use of the device. Further a hole 8 is provided in the bottom side of the encloser body 6 for the passes of the thread 5 therethrough into the pen body 1.

Figure 3:
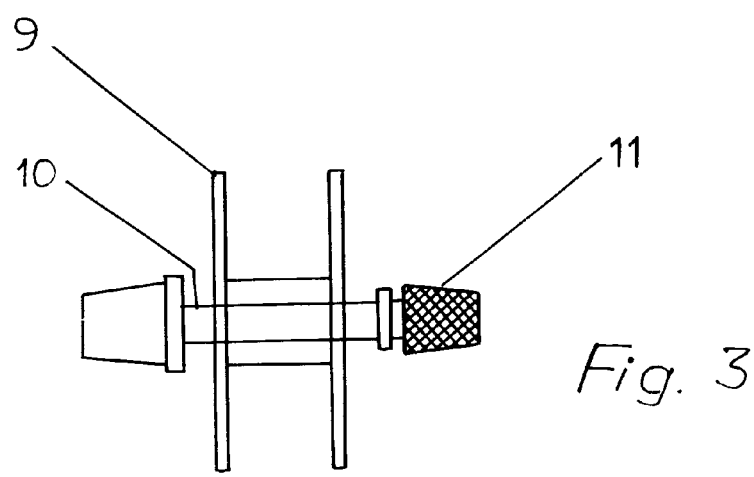
FIG. 3 shows the front and side view of the bobbin spool.

As shown in FIG. 3 bobbin spool 3 comprises a pair of side supports 9 secured on a shaft 10 for supporting the binding of the thread 5 in the spool 3. A knob 11 is provided on both the ends of the shaft 10 for facilitating the rotation of the spool 3 for the binding of the thread therein.

Figure 4:
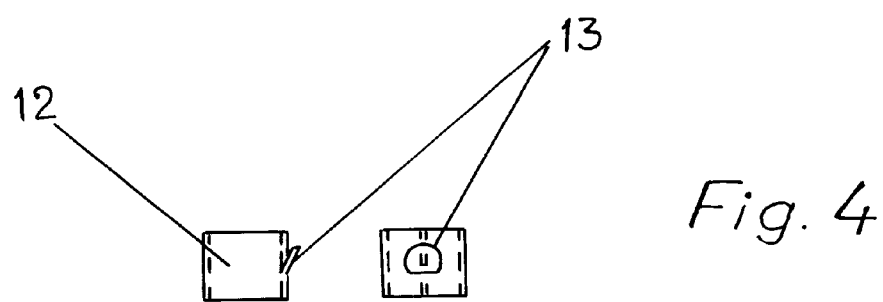
FIG. 4 shows front and side view of the notched sleeve.

As shown in FIG. 4 the cutting means comprises a sleeve 12 having a notch 13 provided for cutting the thread of the user as and when required. The sleeve 12 is adapted to be secured near the delivery/writing of the pen body 1.

Thus it is seen that a blind person can make Sketches, drawing, letters, graphical symbols geometrical shapes by self on a Hook & Loop fabric glued adhesive surface without the help of other person and can feel/realise the saem by touching the thread over the surface and thus it stimulates the user for self learning. A pilot thread is secured with the bobbin spool to guide the thread to be bounded on to the bobbin spool.

According to an option the device may be made as a one piece item charted from a platic material.

We claim:

1. A sketching device for use by a blind person which is a pen for dispensing thread onto a receiving surface, the sketching device comprising:

a pen body which is hollow and which has a writing end;

a bobbin spool encloser which is secured to the pen body, which has slots provided in opposite sides thereof, and which has a hole defined therein through which thread may pass into the pen body;

an axle positioned within the bobbin spool encloser and extending through the slots;

a bobbin spool positioned on the axle;

thread wound onto the bobbin spool, threaded through the hole provided in the bobbin spool encloser and passing into and through the hollow pen body, and exiting the writing end of the pen body;

knobs provided at both the ends of the axle to retain the axle and bobbin spool within the bobbin spool encloser; and thread cutting means provided at the writing end of the pen body for cutting the thread.

2. The device as claimed in claim 1, wherein the bobbin spool encloser comprises a tubular body having a cross-sectional shape.

3. The device as claimed in claim 2, wherein the cross-sectional shape of the bobbin spool encloser is selected from the group consisting of a rectangle, a square and a circle.

4. The device as claimed in claim 2, wherein the slots are T-shaped slots provided on opposite sides of the bobbin spool encloser for holding the bobbin spool removably and rotatably therein.

5. The device as claimed in claim 1, wherein the slots are T-shaped slots provided on opposite sides of the bobbin spool encloser for holding the bobbin spool removably and rotatably therein.

6. The device as claimed in claim 1, wherein the bobbin spool comprises side supports for positioning the bobbin spool on the axle and for holding the thread therebetween, and wherein the knobs provided on the ends of the axle facilitate rotation of the bobbin spool by a user.

7. The device as claimed in claim 1, wherein the bobbin spool comprises side supports for positioning the bobbin spool on the axle and for holding the thread therebetween, and wherein the knobs provided on the ends of the axle facilitate rotation of the bobbin spool by a user.

8. The device as claimed in claim 1, wherein the thread cutting means comprises a sleeve which is positioned on the pen body near the writing end and which has defined therein a cutting notch.

9. The device as claimed in claim 1, wherein the bobbin spool encloser is comprised of a substance selected from the group consisting of a metallic substance and a plastic.

10. The device as claimed in claim 1, wherein the thread is comprised of a substance selected from the group consisting of acrylic and wool.

11. The device as claimed in claim 1, further comprising a pilot thread provided with the bobbin spool for replacement of the thread when required.

12. A sketching device for use by a blind person which is a pen for dispensing thread onto a receiving surface, the sketching device comprising:

a pen body which has a writing end;

a metallic spool encloser which is secured to the pen body and which has slots provided in opposite sides thereof;

an axle positioned within the metallic spool encloser and extending through the slots;

a bobbin spool positioned on the axle;

thread which is one of acrylic or wool, which is wound onto the bobbin spool, which is threaded through the pen body, and which exits the writing end of the pen body;

knobs provided at both the ends of the axle to retain the axle and the bobbin spool within the bobbin spool encloser;

thread cutting means provided at the writing end of the pen body for cutting the thread; and a pilot thread provided with the bobbin spool for replacement of the thread when required.

13. The device as claimed in claim 12, wherein the metallic spool encloser comprises a tubular body having a cross-sectional shape.

14. The device as claimed in claim 13, wherein the cross-sectional shape of the metallic spool encloser is selected from the group consisting of a rectangle, a square and a circle.

15. The device as claimed in claim 13, wherein the slots are T-shaped slots provided on opposite sides of the metallic spool encloser for holding the bobbin spool removably and rotatably therein.

16. The device as claimed in claim 15, wherein the bobbin spool comprises side supports for positioning the bobbin spool on the axle and for holding the thread therebetween, and wherein the knobs provided on the ends of the axle facilitate rotation of the bobbin spool by a user.

17. The device as claimed in claim 12, wherein the slots are T-shaped slots provided on opposite sides of the metallic spool encloser for holding the bobbin spool removably and rotatably therein.

18. The device as claimed in claim 17, wherein the bobbin spool comprises side supports for positioning the bobbin spool on the axle and for holding the thread therebetween, and wherein the knobs provided on the ends of the axle facilitate rotation of the bobbin spool by a user.

19. The device as claimed in claim 12, wherein the bobbin spool comprises side supports for positioning the bobbin spool on the axle and for holding the thread therebetween, and wherein the knobs provided on the ends of the axle facilitate rotation of the bobbin spool by a user.

20. The device as claimed in claim 12, wherein the thread cutting means comprises a sleeve which is positioned on the pen body near the writing end and which has defined therein a cutting notch.

* * * * *